United States Patent
Park et al.

(10) Patent No.: US 11,012,957 B2
(45) Date of Patent: May 18, 2021

(54) METHOD AND APPARATUS FOR IMPROVING SYNCHRONIZATION IN WIRELESS COMMUNICATION SYSTEM

(71) Applicant: Samsung Electronics Co., Ltd., Suwon-si (KR)

(72) Inventors: Byungjoon Park, Suwon-si (KR); Seijoon Shim, Suwon-si (KR); Hayoung Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/387,378

(22) Filed: Apr. 17, 2019

(65) Prior Publication Data

US 2019/0320398 A1    Oct. 17, 2019

(30) Foreign Application Priority Data

Apr. 17, 2018    (KR) .......... 10-2018-0044661

(51) Int. Cl.
*H04W 76/11* (2018.01)
*H04B 17/336* (2015.01)
*H04W 56/00* (2009.01)
*H04L 5/00* (2006.01)

(52) U.S. Cl.
CPC ........ *H04W 56/001* (2013.01); *H04B 17/336* (2015.01); *H04L 5/0094* (2013.01); *H04W 76/11* (2018.02)

(58) Field of Classification Search
CPC .. H04W 56/001; H04W 76/11; H04B 17/336; H04L 5/0094

USPC ....................................... 370/329
See application file for complete search history.

(56) References Cited

U.S. PATENT DOCUMENTS

| | | | |
|---|---|---|---|
| 9,681,288 B2 | 6/2017 | Mueck et al. | |
| 9,781,730 B2 | 10/2017 | Lo et al. | |
| 2008/0080439 A1* | 4/2008 | Aziz | H04L 5/0048 370/338 |
| 2009/0086669 A1* | 4/2009 | McCoy | H04J 11/0079 370/329 |
| 2011/0007657 A1* | 1/2011 | Kazmi | H04J 11/0093 370/252 |

(Continued)

FOREIGN PATENT DOCUMENTS

| | | |
|---|---|---|
| KR | 10-2017-0093675 A | 8/2017 |
| WO | 2017/150889 A1 | 9/2017 |

OTHER PUBLICATIONS

International Search Report dated Jul. 25, 2019 in connection with International Patent Application No. PCT/KR2019/004419, 3 pages.

(Continued)

*Primary Examiner* — Faisal Choudhury

(57) ABSTRACT

The disclosure relates to a 5G or pre-5G communication system for supporting a higher data rate after a 4G communication system such as LTE. According to an embodiment, a method of a base station in a wireless communication system includes identifying, in a synchronization block to be generated, a resource to which a signal related to the synchronization block is not mapped, determining whether to map a specific signal to the identified resource, and transmitting, to a terminal, the synchronization block generated based on a result of the determination.

12 Claims, 10 Drawing Sheets

(56) References Cited

U.S. PATENT DOCUMENTS

| | | | |
|---|---|---|---|
| 2012/0307820 A1 | 12/2012 | Tomatis et al. | |
| 2014/0177588 A1 | 6/2014 | Chun et al. | |
| 2014/0315561 A1* | 10/2014 | Hooli | H04W 16/14 |
| | | | 455/450 |
| 2015/0264638 A1* | 9/2015 | Han | H04W 48/16 |
| | | | 370/329 |
| 2016/0337998 A1 | 11/2016 | Kim | |
| 2018/0109912 A1* | 4/2018 | Kang | H04L 5/0035 |
| 2018/0167122 A1* | 6/2018 | Gao | H04B 7/0626 |
| 2018/0324732 A1* | 11/2018 | Park | H04W 56/0015 |
| 2019/0028984 A1 | 1/2019 | Lee et al. | |
| 2019/0044584 A1 | 2/2019 | Lee et al. | |
| 2019/0053281 A1* | 2/2019 | strom | H04W 56/0005 |
| 2019/0150120 A1* | 5/2019 | Sarkis | H04W 72/042 |
| | | | 370/329 |
| 2019/0230696 A1* | 7/2019 | Kim | H04L 5/0053 |
| 2019/0363809 A1* | 11/2019 | Yoon | H04W 56/00 |
| 2019/0363843 A1* | 11/2019 | Gordaychik | H04L 1/1887 |
| 2020/0213051 A1* | 7/2020 | Wu | H04L 1/00 |
| 2020/0236729 A1* | 7/2020 | Ahn | H04L 5/0048 |

OTHER PUBLICATIONS

Written Opinion of the International Searching Authority dated Jul. 25, 2019 in connection with International Patent Application No. PCT/KR2019/004419, 4 pages.

* cited by examiner

FIG. 4B

| CELL ID/SEQUENCE SET | PSS | SSS | a new signal |
|---|---|---|---|
| Cell #0 | {c[0], c[1], ... c[10]} | {c'[0], c'[1], ... c'[10]} | {s[0], s[1], ... s[50]} |
| Cell #1 | {c[11], c[12], ... c[20]} | {c'[11], c'[12], ... c'[20]} | {s[51], s[52], ... s[100]} |
| Cell #2 | {c[21], c[22], ... c[30]} | {c'[21], c'[22], ... c'[30]} | {s[101], s[102], ... s[150]} |
| ... | ... | ... | ... |

METHOD AND APPARATUS FOR IMPROVING SYNCHRONIZATION IN WIRELESS COMMUNICATION SYSTEM

CROSS-REFERENCE TO RELATED APPLICATION

This application is based on and claims priority under 35 U.S.C. § 119 to Korean Patent Application No. 10-2018-0044661, filed on Apr. 17, 2018, in the Korean Intellectual Property Office, the disclosure of which is incorporated by reference herein in its entirety.

BACKGROUND

1. Field

The disclosure relates to a method and apparatus for improving synchronization between a terminal and a base station in a new radio system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access network (cloud RAN), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged.

As technology elements, such as "sensing technology", "wired/wireless communication and network infrastructure", "service interface technology", and "security technology" have been demanded for IoT implementation, a sensor network, machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud RAN as the above-described big data processing technology may also be considered to be as an example of convergence between the 5G technology and the IoT technology.

Wireless communication systems that have initially provided voice-oriented services are now evolving into broadband communication systems that provide high-speed, high-quality packet data services, based on communication standards such as high speed packet access (HSPA), long term evolution (LTE, or referred to as evolved universal terrestrial radio access (E-UTRA)), or LTE-advanced (LTE-A) of the 3rd generation partnership project (3GPP), high rate packet data (HRPD) of 3GPP2, ultra mobile broadband (UMB), and 802.16e of institute of electrical and electronics engineers (IEEE).

Meanwhile, in the 5G communication system, a base station can transmit a block allowing a terminal to perform synchronization with the base station and to access a cell. This block is often referred to as SS/PBCH block (SSB), where SS stands for a synchronization signal and PBCH stands for a physical broadcast channel. Using the SSB received from the base station, the terminal acquires the downlink synchronization with the base station and a cell ID and performs a procedure of accessing the cell.

The SSB is composed of four symbols in the time domain and may include a primary synchronization signal (PSS), a secondary synchronization signal (SSS), and a PBCH associated with a demodulation reference signal (DMRS). Among resource elements constituting the SSB, there are some resource elements to which none of the PSS, the SSS, and the PBCH are mapped. Because a physical downlink shared channel (PDSCH) or a physical downlink control channel (PDCCH) cannot be included in the SSB, the SSB has in general a resource to which no signal is mapped.

SUMMARY

The disclosure provides a method and apparatus for improving synchronization between a terminal and a base station without any separate signaling by using a resource to which no signal is mapped in an SSB.

According to various embodiments of the disclosure, a method of a base station in a wireless communication system may include identifying, in a synchronization block to be generated, a resource to which a signal related to the synchronization block is not mapped; determining whether to map a specific signal to the identified resource; and transmitting, to a terminal, the synchronization block generated based on a result of the determination.

According to various embodiments of the disclosure, a method of a terminal in a wireless communication system may include receiving a synchronization block from a base station; performing decoding for a symbol of the received synchronization block in which a primary synchronization signal (PSS) is transmitted; and determining a cell ID based on a specific signal, in case that the specific signal is detected by the decoding.

According to various embodiments of the disclosure, a base station in a wireless communication system may include a transceiver, and a controller configured to identify, in a synchronization block to be generated, a resource to which a signal related to the synchronization block is not mapped, to determine whether to map a specific signal to the identified resource, and to transmit, to a terminal, the synchronization block generated based on a result of the determination.

According to various embodiments of the disclosure, a terminal in a wireless communication system may include a transceiver, and a controller configured to control the transceiver to receive, from a base station, a synchronization block, perform decoding for a symbol of the received synchronization block in which a primary synchronization signal (PSS) is transmitted, and to determine a cell ID based on a specific signal in case that the specific signal is detected by the decoding.

According to embodiments of the disclosure, the base station utilizes a resource that has been transmitted in an empty state without being mapped to any signal in the SSB, thereby increasing the synchronization reception ratio of the terminal without wasting additional resources.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4B illustrates a diagram of an example of sequences of signals to be transmitted in a NOR area according to an embodiment of the disclosure.

DETAILED DESCRIPTION

Figure 1:
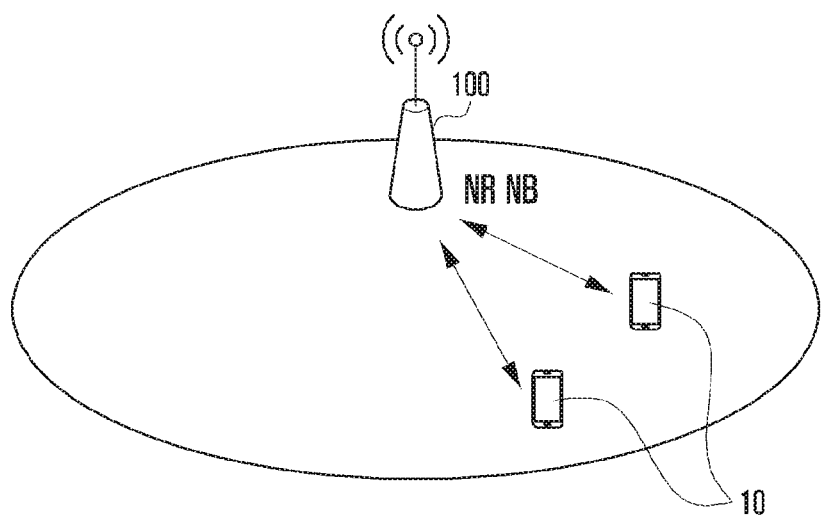
FIG. 1 illustrates a conceptual diagram of an initial access to a base station at a terminal according to an embodiment of the disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Now, various embodiments of the disclosure will be described in detail with reference to the accompanying drawings. In the following, descriptions of techniques that are well known in the art and not directly related to the disclosure may be omitted. This is to clearly convey the subject matter of the disclosure by omitting unnecessary explanation. Terms used herein may not be intended to limit embodiments described in the disclosure. The singular expressions may include plural expressions unless the context clearly dictates otherwise.

In addition, embodiments described hereinafter on the basis of a particular communication system may be also applied to any other communication system having a similar technical background or channel form through some modifications within the scope of the disclosure. This will be apparent to a person skilled in the art.

The advantages and features of the disclosure and the manner of achieving them will become apparent with reference to embodiments described in detail below and with reference to the accompanying drawings. The disclosure may, however, be embodied in many different forms and should not be construed as being limited to embodiments set forth herein. Rather, these embodiments are provided so that this disclosure will be thorough and complete and will fully convey the scope of the disclosure to those skilled in the art. To fully disclose the scope of the disclosure to those skilled in the art, the disclosure is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

Hereinafter, a method and apparatus for improving synchronization of a terminal according to embodiments of the disclosure will be described with reference to the accompanying drawings.

FIG. 1 illustrates a conceptual diagram of an initial access to a base station at a terminal according to an embodiment of the disclosure.

The terminal 10 can perform a cell search when initially accessing a system. In order to facilitate the cell search of the terminal 10, the base station 100 may transmit a synchronization signal to the terminal 10 to perform downlink synchronization.

For example, in the LTE, a base station transmits a primary synchronization signal (PSS) and a secondary synchronization signal (SSS) on each downlink component carrier, and a terminal receives the PSS and the SSS and obtains downlink transmission timing and a cell ID. Then, the terminal measures a channel state by using the transmission timing and the cell ID, identifies a downlink bandwidth and the like by receiving a master information block (MIB) transmitted through a physical broadcast channel (PBCH), and performs a procedure for accessing a cell.

In the new radio (NR) as well, the terminal 10 receives information for downlink synchronization from the base station 100 and may, based on this, attempt downlink synchronization and cell access. Especially, in case of the NR, the base station 100 transmits an SS/PBCH block (SSB) for downlink synchronization of the terminal 10. As mentioned above, SS stands for a synchronization signal, and PBCH stands for a physical broadcast channel. The SSB has a structure including the PSS, the SSS, and the PBCH. The terminal receiving the SSB performs a procedure for accessing a cell through decoding of the PSS, the SSS, and the PBCH included in the SSB.

Now, the structure and transmission of the SSB according to an embodiment of the disclosure will be described in detail with reference to FIGS. 2 and 3.

Figure 2:
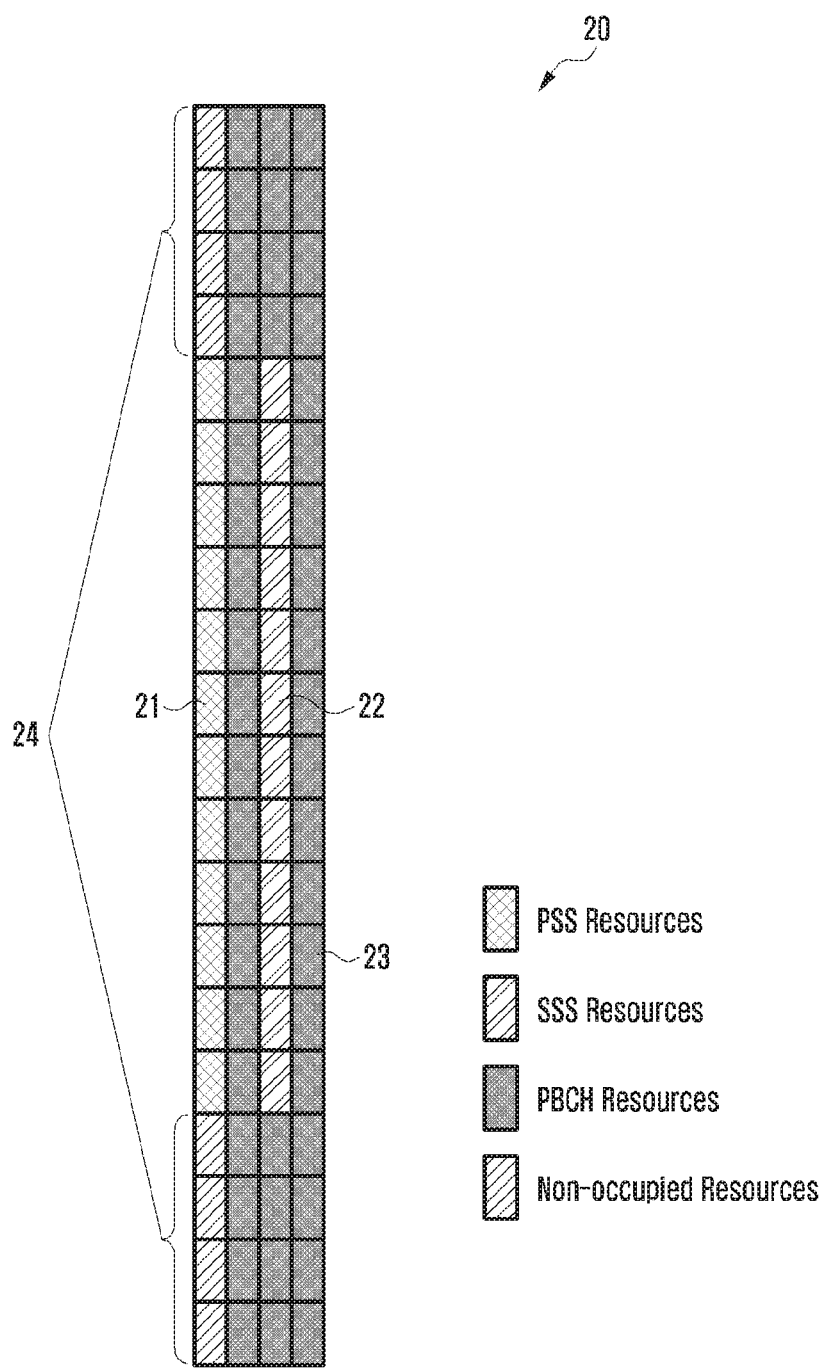
FIG. 2 illustrates a diagram of the structure of an SSB according to an embodiment of the disclosure.
Figure 3:
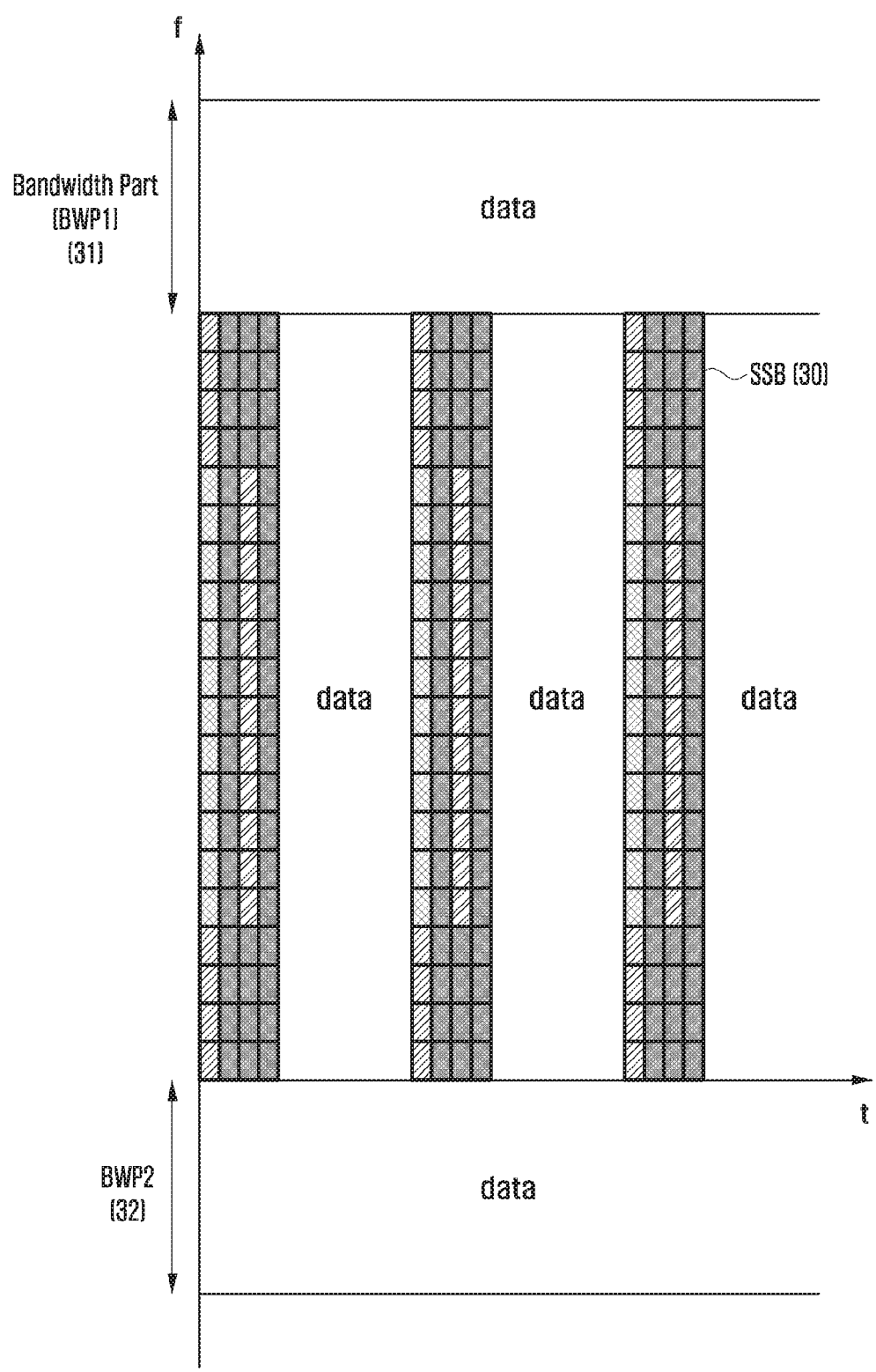
FIG. 3 illustrates a diagram of a certain bandwidth containing an SSB according to an embodiment of the disclosure.

FIG. 2 illustrates a diagram of the structure of an SSB according to an embodiment of the disclosure, and FIG. 3 illustrates a diagram of a certain bandwidth including an SSB according to an embodiment of the disclosure.

The block shown in FIG. 2 is divided into four sections in a horizontal direction and also divided into twenty sections in a vertical direction. In FIG. 2, one section in the horizontal direction corresponds to one symbol in the time domain, and one section in the vertical direction corresponds to one resource block (RB).

The block shown in FIG. 2 indicates an SSB 20 according to an embodiment of the disclosure. The SSB 20 according to an embodiment is composed of four symbols and includes a PSS 21, an SSS 22, and a PBCH 23.

Specifically, each of the PSS 21 and the SSS 22 may be allocated to twelve RBs (one RB may include twelve subcarriers) in different orthogonal frequency-division multiplexing (OFDM) symbols. That is, as shown in FIG. 2, the PSS 21 is mapped to twelve RBs in the first symbol, and the SSS 22 is mapped to twelve RBs in the third symbol.

The PBCH 23 is allocated to twenty RBs in each of two OFDM symbols. Also, the PBCH 23 is allocated to two groups of four RBs on both sides of the SSS-allocated RBs in a symbol where the SSS 22 is allocated. That is, in each of the second and fourth symbols of the SSB 20, the PBCH 24 is mapped to twenty RBs, and in the third symbol, the PBCH 24 is mapped to four RBs higher than the SSS-mapped RBs in the frequency domain and also to four RBs lower than the SSS-mapped RBs.

When the SSB 20 is constructed as described above, in the first symbol where the PSS 21 is mapped, there is a resource 24 to which no signal is mapped. That is, in the first symbol of the SSB 20, two groups of four RBs to which a signal associated with the synchronization block is not mapped exist on both sides of the PSS-mapped RBs in the frequency domain. In the disclosure, this resource 24 to which no signal related to the SSB 20 is mapped is defined as non-occupied resources (NOR).

In general, a physical downlink shared channel (PDSCH) or a physical downlink control channel (PDCCH) cannot be allocated to the NOR 24. This is the multi-numerology characteristics in the NR standard. That is, this is because a bandwidth part (BWP) in which the PDCCH or the PDSCH is allocated is defined by avoiding the RBs allocated in the SSB 20 in order to minimize the data interference in the synchronization signal.

Specifically, as shown in FIG. 3, an SSB 30 occupying twenty RBs in the frequency domain may be transmitted according to a predetermined period. In the NR standard, the SSB is a synchronization signal and broadcast data transmission block to be periodically transmitted for the purpose of synchronization between a base station and a terminal. The transmission period is determined as default, and an operator is required to set the period and the number of retransmissions. As shown in FIG. 3, for data transmission, a first bandwidth part (BWP1) 31 and a second bandwidth part (BWP2) 32 are defined in the frequency domain except for the RB area where the SSBs 30 are transmitted.

Because data is transmitted in the resource area excluding the SSB, the base station generates and transmits the SSB in which a NOR area is in an empty state without signal mapping.

An embodiment of the disclosure proposes a method of transmitting an additional signal via the NOR area. It is therefore possible to improve synchronization of a terminal while restricting interference with adjacent BWPs but requiring no separate signaling and also to improve hearability.

Figure 4A:
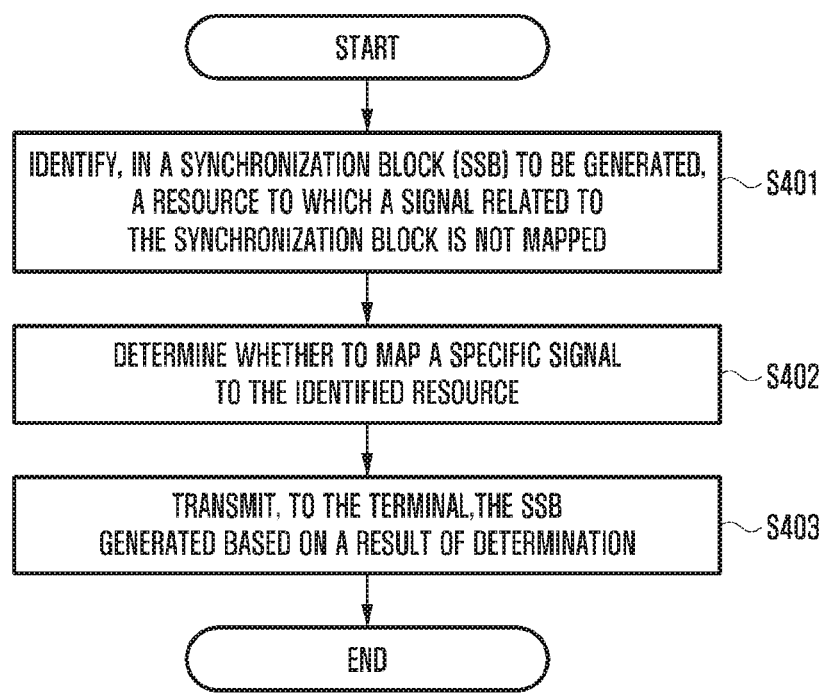
FIG. 4A illustrates a flow diagram of a method for transmitting an SSB according to an embodiment of the disclosure.

FIG. 4A illustrates a flow diagram of a method for transmitting an SSB according to an embodiment of the disclosure, and FIG. 4B illustrates a diagram of an example of sequences of signals to be transmitted in a NOR area according to an embodiment of the disclosure.

Referring to FIG. 4A, at step S401, a base station according to an embodiment of the disclosure identifies, in a synchronization block (SSB) to be generated, a resource to which no signal related to the synchronization block is mapped.

As described above, in the SSB, there is a NOR area which is in an empty state and to which none of the PSS, the SSS, and the PBCH are mapped. The base station can identify the NOR area.

At step S402, the base station determines whether to map a specific signal to the identified resource.

The specific signal refers to a signal to be transmitted in the NOR area, and the base station and the terminal may agree on the specific signal in advance. For example, by mutual agreement between the terminal and the base station, a part of the PSS and/or a part of the SSS transmitted in the SSB may be used as the specific signal. Alternatively or additionally, by mutual agreement between the terminal and the base station, a part of a signal generated using a sequence generator different from the sequence used for the PSS and the SSS may be used as the specific signal.

In detail, the specific signal may be a part of the PSS transmitted in the SSB. In the NR, the PSS is a 127-length sequence and uses a sequence selected from among three sequences according to a cell ID. In particular, the synchronization reception performance is determined by the length of a sequence used for synchronization detection. According to an embodiment, the synchronization may be improved by further mapping a part of the PSS to the NOR area and thereby increasing the length of a sequence.

In addition, the specific signal may be a part of the SSS transmitted in the SSB. That is, the base station may copy a certain part of the SSS transmitted in the SSB and map the copied part to the NOR area. In this case, because the terminal can decode the part of the SSS mapped to the NOR area by decoding a symbol in which the PSS is transmitted, the terminal can obtain the cell ID quickly.

In addition, by mutual agreement between the terminal and the base station, a part of sequences generated from a predetermined sequence generator may be used as the specific signal mapped to the NOR area. For example, the sequence generated from the predetermined sequence generator is a 31-length gold sequence and may be defined according to the following equation.

$$c(n)=(x_1(n+N_c)+x_2(n+N_c))\mod 2$$

$$x_1(n+31)=(x_1(n+3)+x_1(n))\mod 2$$

$$x_2(n+31)=(x_2(n+3)+x_2(n+2)+x_2(n+1)+x_2(n))\mod 2$$

In accordance with the above equation, the base station and the terminal may use, as the specific signal, a sequence generated by varying, for each cell, an initial value of sequence generation and a used position.

In this case, a part of the predetermined sequences, which is mapped to the NOR area, may correspond to a specific cell ID. For example, the base station and the terminal may store a mapping table that records a plurality of sequence sets generated from a part of the predetermined sequences and different cell IDs mapped to the corresponding sequence sets. Then, the terminal can obtain the cell ID quickly by using the stored mapping table after decoding the specific signal included in the NOR area.

For example, as shown in FIG. 4B, when the specific signal is a part of the PSS, a part of the SSS, and/or a part of a new signal generated from the predetermined sequence generator, a mapping table in which the respective signals are mapped to different cell IDs may be defined in the terminal and the base station.

That is, in order to improve the synchronization of the terminal, the base station may map a part of the signals corresponding to the cell ID to the NOR area by using the stored mapping table. In addition, using the stored mapping table, the base station may variously select a part of the signals to be further transmitted via the NOR area so as to meet the purpose of the system.

After determining whether to map the specific signal, the base station may transmit, to the terminal, the SSB differently generated based on a result of determination at step S403.

Meanwhile, as described above with reference to FIG. 3, data may be transmitted in the BWP adjacent to the RB area where the SSB is transmitted. In the NR, a spacing of subcarriers included in the respective RBs may be varied due to multi-numerology, and interference with data may be caused when mapping the specific signal to the NOR area rather than when placing the NOR area in an empty state.

Figure 5:
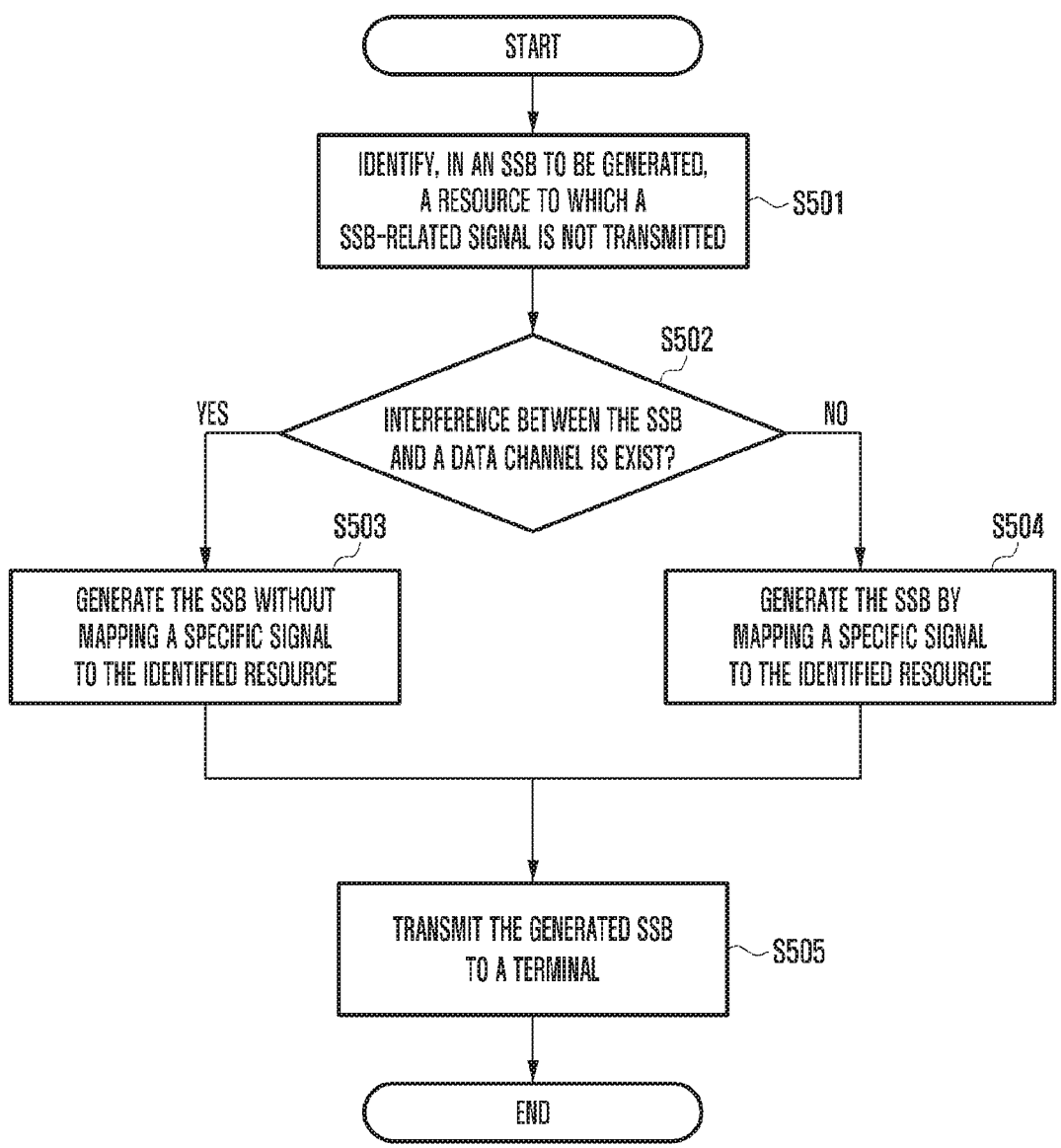
FIG. 5 illustrates a flow diagram of a method for transmitting an SSB generated in consideration of interference according to an embodiment of the disclosure.

FIG. 5 illustrates a flow diagram of a method for transmitting an SSB generated in consideration of interference according to an embodiment of the disclosure.

Referring to FIG. 5, at step S501, a base station identifies, in the SSB to be generated, a resource to which no SSB-related signal is transmitted.

Then, in order to determine whether to map a specific signal to the identified resource, the base station determines at step S502 whether there is interference between the SSB and a data channel transmitted in a bandwidth part adjacent to the SSB.

A subcarrier spacing of the SSB (hereinafter referred to as the first subcarrier spacing) may be determined as 15 kHz or 30 kHz. In contrast, a subcarrier spacing of the data channel (hereinafter referred to as the second subcarrier spacing) may be determined as 15 kHz, 30 kHz, 60 kHz, or the like.

When the first subcarrier spacing is different from the second subcarrier spacing, interference may occur between the SSB and the data channel transmitted in the bandwidth part adjacent to the SSB.

When it is determined at step S502 that interference occurs between the SSB and the data channel, the base station may generate the SSB without mapping the specific signal to the identified resource (i.e., the NOR area) at step S503.

Although FIG. 5 shows an example in which a specific signal is not mapped to the NOR area of the SSB, the present invention is not limited to this. Alternatively, the base station may map the specific signal to two groups of only two RBs on upper and lower sides of the PSS-mapped area in the NOR area composed of two groups of four RBs. That is, in alternative embodiments, the base station may map the specific signal to only a part of the NOR area in consideration of the degree of interference.

Contrary to the above, when it is determined at step S502 that interference does not occur between the SSB and the data channel, the base station may generate the SSB by mapping the specific signal to the identified resource (i.e., the NOR area) at step S504.

After the step S503 or S504, the base station transmits the generated SSB to the terminal at step S505.

In the above-described embodiment of FIG. 5, the base station does not map the specific signal to the NOR area when there is interference between the SSB and the data channel. Alternatively, the base station may define pulse-shaping or windowing to reduce the interference between the data channel and the SSB, thereby mapping the specific signal to the entire NOR area.

When the base station generates and transmits the SSB as described above, the terminal may receive the SSB, synchronize with the base station, and access the cell.

Figure 6A:
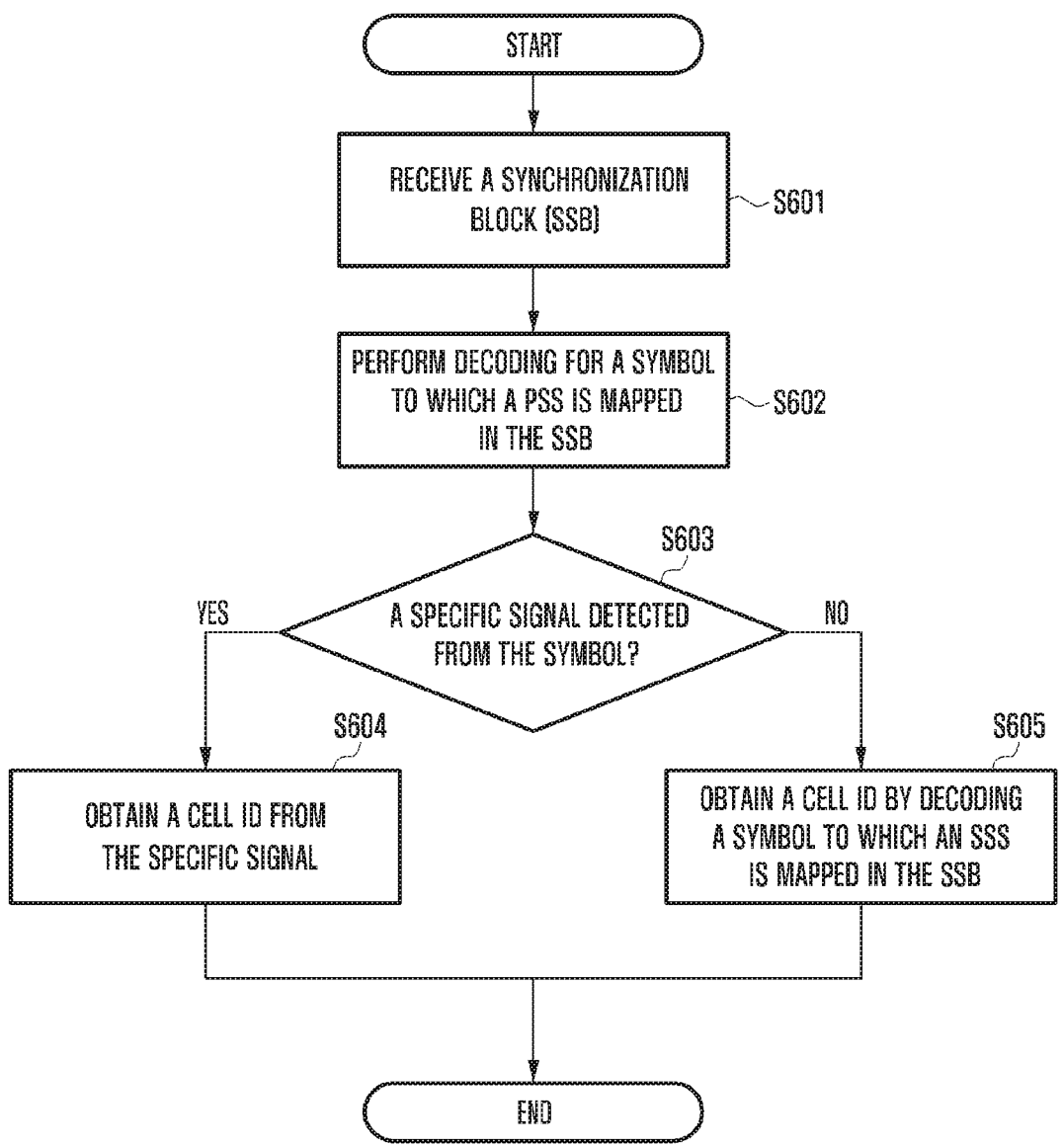
FIG. 6A illustrates a flow diagram of an operation of a terminal receiving an SSB according to an embodiment of the disclosure.
Figure 6B:
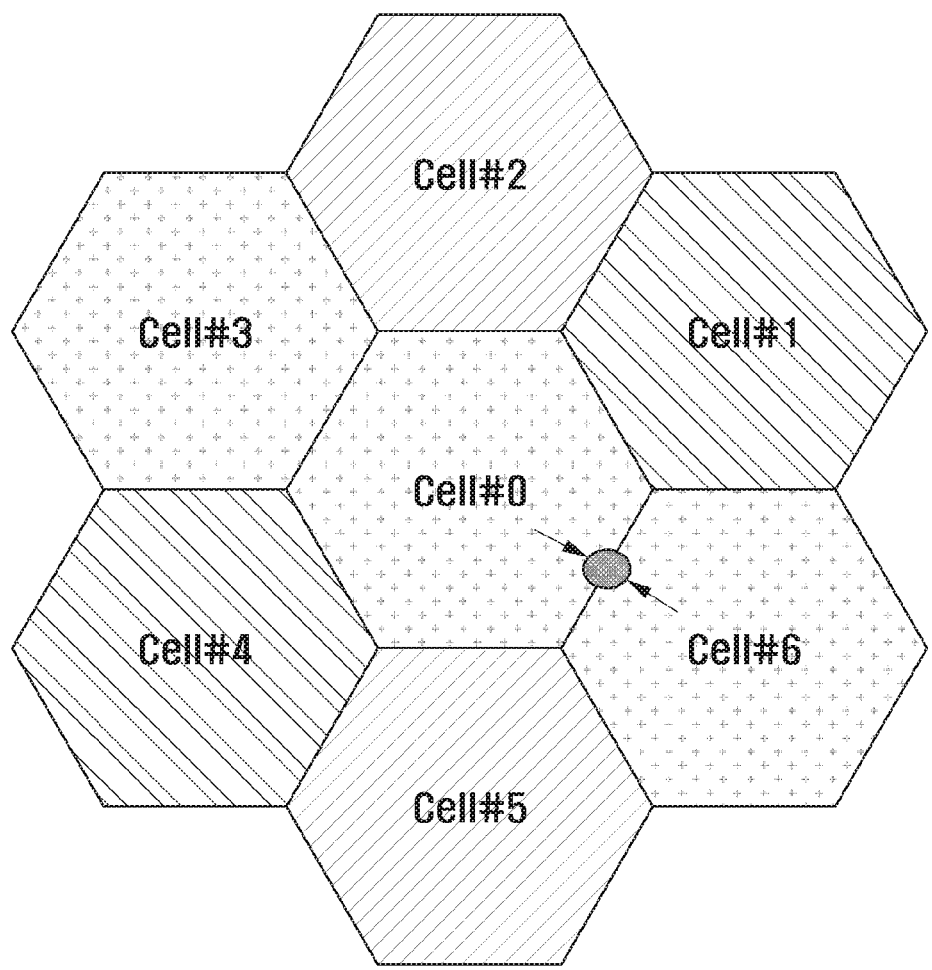
FIG. 6B illustrates a conceptual diagram of a situation in which a terminal receives an SSB from a plurality of cells.

FIG. 6A illustrates a flow diagram of an operation of a terminal receiving an SSB according to an embodiment of the disclosure, and FIG. 6B illustrates a conceptual diagram of a situation in which a terminal receives an SSB from a plurality of cells.

Referring to FIG. 6A, at step S601, the terminal may receive a synchronization block (i.e., the above-mentioned SSB) from a base station.

In addition, at step S602, the terminal may perform decoding on a symbol in which the PSS is transmitted in the SSB.

Specifically, the terminal may decode the received SSB to perform a procedure for cell access. At this time, the terminal may perform decoding in the order of the PSS, the SSS, and the PBCH in the SSB in order to synchronize downlink transmitted from the base station, obtain a cell ID, estimate a channel, and obtain the MIB for cell access.

For example, in case of the LTE, the terminal obtains 5 ms transmission timing of a cell through the PSS and recognizes a cell ID in a cell ID group. Then, the terminal obtains frame timing through the SSS, recognizes the cell ID group, and obtains the corresponding cell ID. Then, the terminal performs channel estimation through a reference signal by using the obtained cell ID and receives the MIB.

As such, the terminal may perform decoding first on a symbol through which the PSS is transmitted in the SSB. When there has been a mutual agreement between the terminal and the base station that a specific signal may be mapped to an NOR area in the SSB, the terminal may perform decoding on the entire symbol through which the PSS is transmitted, that is, including the NOR area as well as the PSS-mapped area.

Based on a result of decoding, the terminal determines at step S603 whether a specific signal is detected in the NOR area.

When the specific signal is detected in the NOR area, the terminal may obtain a cell ID from the specific signal at step S604.

That is, the terminal generally decodes the PSS and then decodes the SSS to obtain a cell ID, whereas the terminal according to an embodiment of the disclosure may obtain a cell ID directly through the specific signal.

For example, the terminal identifies a signal sequence used as the specific signal mapped to the NOR area and quickly obtains an ID of a cell accessed by the terminal by utilizing a mapping table in which different cell IDs are mapped to a set of sequences as shown in FIG. 4B.

Particularly, obtaining the cell ID as above may be useful in a situation where cells are located adjacent to each other as shown in FIG. 6B. For example, in the NR, the PSS may use one of three sequences selected according to the cell ID. As shown, cell #0, cell #3, and cell #6 may use the same PSS sequence, cell #2 and cell #5 may use the same PSS sequence, and cell #1 and cell #4 may use the same PSS sequence.

In this situation, when the terminal is located between the cell #0 and the cell #6 as shown in FIG. 6B, the terminal receives the same PSS from each base station. Therefore, decoding only the PSS fails to distinguish signals of the cell #0 and the cell #6.

However, according to an embodiment of the disclosure, the terminal may quickly obtain the cell ID through the specific signal detected in the NOR area before decoding the SSS, thereby quickly knowing a cell that the terminal attempts to access, and also quickly knowing timing information and position information from the cell. In addition, the terminal may quickly identify the MIB by using the DMRS according to the obtained cell ID.

On the other hand, when there is no mutual agreement on the NOR area between the terminal and the base station, or when there is interference with the data channel, the base station may not map the specific signal to the NOR area. In this case, the terminal fails to detect the specific signal in the NOR area at step S603 and thus obtain the cell ID at step S605 by decoding a symbol through which the SSS is transmitted in the SSB.

According to an embodiment of the disclosure, the base station can utilize a resource that has been transmitted in an empty state in the SSB, even without any signaling (e.g., RRC signaling). Therefore, it is possible to increase a synchronization reception ratio of the terminal without wasting additional resources.

Figure 7:
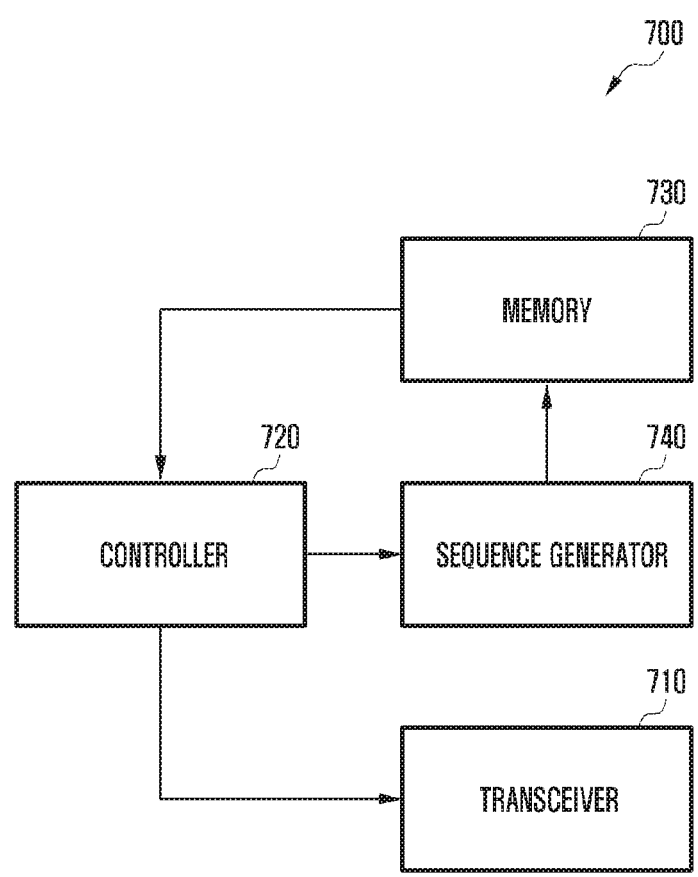
FIG. 7 illustrates a block diagram of the configuration of a base station according to an embodiment of the disclosure.

FIG. 7 illustrates a block diagram of the configuration of a base station according to an embodiment of the disclosure.

Referring to FIG. 7, the base station 700 according to an embodiment of the disclosure may include a transceiver 710, a controller 720, a memory 730, and a sequence generator 740.

The transceiver 710 may be also referred to as a wireless communication unit/circuit, a communication unit/circuit, or the like. According to an embodiment of the disclosure, the transceiver 710 may transmit an SSB including a PSS, an SSS, and a PBCH to a plurality of terminals. In addition, the transceiver 710 may transmit, to a plurality of terminals, an SSB that further includes a specific signal in a NOR area to which no signal is mapped.

In addition, the transceiver 710 may perform functions for transmitting and receiving a signal through a radio channel. For example, the transceiver 710 may perform a function of converting a baseband signal and a bit sequence in accordance with a physical layer standard of a system. For example, in case of data transmission, the transceiver 710 may generate complex symbols by encoding and modulating a transmission bit sequence. Also, in case of data reception, the transceiver 710 may recover a reception bit sequence by demodulating and decoding a baseband signal.

In addition, the transceiver 710 may up-convert a baseband signal to a radio frequency (RF) band signal and transmit the RF signal through an antenna, or may down-convert an RF band signal received through an antenna to a baseband signal. For example, the transceiver 710 may include a transmission filter, a reception filter, an amplifier, a mixer, an oscillator, a digital-to-analog converter (DAC), an analog-to-digital converter (ADC), and the like.

The controller 720 may control the overall operations of the base station 700. In addition, the controller 720 may write or read data into or from the memory 730. The controller 720 may include at least one processor or microprocessor, or may be a part of a processor.

For example, the controller 720 may generate the SSB according to an embodiment of the disclosure and control the transceiver 710 to transmit the generated SSB to the terminal. Specifically, the controller 720 may generate the SSB in which the specific signal is mapped to the NOR area in accordance with an advance agreement with the terminal. At this time, the controller 720 may determine which signal in a list is to be mapped as the specific signal to the NOR area depending on the status or purpose of the system.

For example, in order to increase the synchronization reception ratio of the terminal, the controller 720 may generate the SSB by mapping a part of the PSS to the NOR area as the specific signal. As another example, in order to allow the terminal to quickly obtain information (cell ID, location, etc.) about a cell accessed by the terminal, the controller 720 may use sequences corresponding to a specific cell ID as the specific signal.

The controller 720 may control the sequence generator 740 to generate predetermined sequences in order to obtain the specific signal.

The memory 730 may store sets of sequences to be selectively used as the specific signal, and also store information (e.g., a mapping table) about cell IDs respectively mapped to the sets of sequences. In addition, the memory 730 may store a basic program, an application program, setting information, and/or data which are required for the operation of the base station 700. The memory 730 may be composed of a volatile memory and/or a nonvolatile memory.

The sequence generator 740 may generate different kinds of sequences (e.g., Pseudo-random sequence, Zadoff-chu sequence, and the like) under the control of the controller 720.

Figure 8:
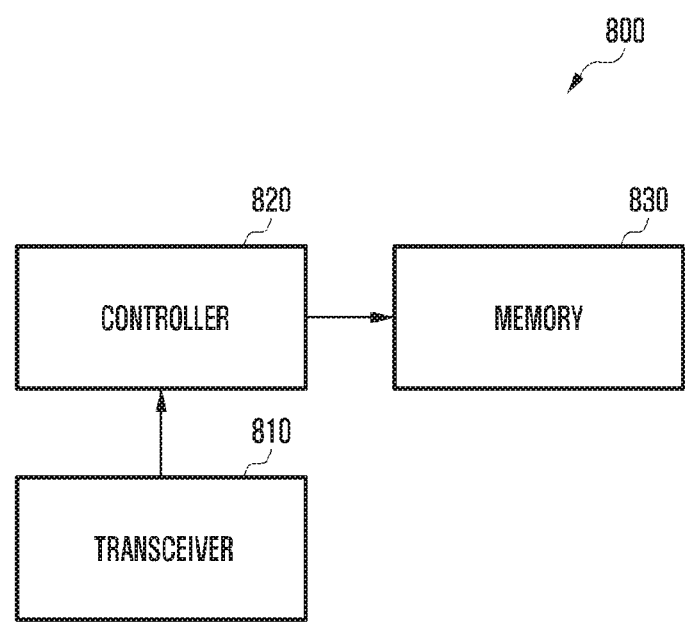
FIG. 8 is a block diagram illustrating the configuration of a terminal according to an embodiment of the disclosure.

FIG. 8 illustrates a block diagram of the configuration of a terminal according to an embodiment of the disclosure.

Referring to FIG. 8, the terminal 800 according to an embodiment of the disclosure may include a transceiver 810, a controller 820, and a memory 830.

The transceiver 810 may be also referred to as a wireless communication unit/circuit, a communication unit/circuit, or the like. According to an embodiment of the disclosure, the transceiver 810 may receive an SSB including a PSS, an SSS, and a PBCH from a base station. In addition, the transceiver 810 may estimate a downlink channel by using downlink synchronization and a cell ID obtained from the SSB.

In addition, the transceiver 810 may perform functions for transmitting and receiving a signal through a radio channel. For example, the transceiver 810 may perform a function of converting a baseband signal and a bit sequence in accordance with a physical layer standard of a system. For example, in case of data transmission, the transceiver 810 may generate complex symbols by encoding and modulating a transmission bit sequence. Also, in case of data reception, the transceiver 810 may recover a reception bit sequence by demodulating and decoding a baseband signal.

In addition, the transceiver 810 may up-convert a baseband signal to a radio frequency (RF) band signal and transmit the RF signal through an antenna, or may down-convert an RF band signal received through an antenna to a baseband signal. For example, the transceiver 810 may include a transmission filter, a reception filter, an amplifier, a mixer, an oscillator, a digital-to-analog converter (DAC), an analog-to-digital converter (ADC), and the like.

The controller 820 may control the overall operations of the terminal 800. In addition, the controller 820 may write or read data into or from the memory 830. The controller 820 may include at least one processor or microprocessor, or may be a part of a processor.

For example, the controller 820 may check whether the specific signal is included in the NOR area of the SSB received from the base station. If included, the controller 820 may obtain the cell ID from the NOR area. As another example, the controller 820 may identify the stored cell ID corresponding to the specific signal detected from the SSB by using a mapping table stored in the memory 830, and obtain an ID of a cell accessed by the terminal.

In addition, the controller 820 may control the transceiver 810 to perform cell estimation by using the obtained cell ID.

The memory 830 may store sets of sequences to be selectively used as the specific signal according to an advance agreement with the base station, and also store information (e.g., a mapping table) about cell IDs respectively mapped to the sets of sequences. In addition, the memory 830 may store a basic program, an application program, setting information, and/or data which are required for the operation of the terminal 800. The memory 830 may be composed of a volatile memory and/or a nonvolatile memory.

It will be understood by those skilled in the art that the above-described embodiments are exemplary only and the disclosure may be embodied in other specific forms without departing from the subject matter thereof. The scope of the disclosure is defined by appended claims rather than the foregoing detailed description, and all changes or modifications derived from the meaning and scope of claims and their equivalents are included in the scope of the disclosure.

While the disclosure has been particularly shown and described with reference to exemplary embodiments thereof, it will be understood by those skilled in the art that various changes in form and details may be made therein without departing from the scope of the subject matter as defined by the appended claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a base station in a wireless communication system, the method comprising:
   identifying a first resource based on excluding a second resource from a synchronization signal block (SSB), wherein a primary synchronization signal (PSS), a secondary synchronization signal (SSS), and a physical broadcast channel (PBCH) are to be mapped to the second resource;
   determining whether to map a specific signal to the first resource based on an interference between the SSB and a data channel transmitted on a bandwidth part adjacent to the SSB, the specific signal corresponds to a specific cell identification (ID);
   mapping the specific signal to the first resource, in case that the interference does not exist; and
   transmitting, to a terminal, the SSB including the specific signal,
   wherein the first resource is located in a symbol in which the PSS is transmitted, and
   wherein the SSB is generated without mapping the specific signal, in case that the interference exists.

2. The method of claim 1, further comprising:
   comparing a first subcarrier spacing of the SSB with a second subcarrier spacing of the data channel; and
   determining that the interference exists in case that the first subcarrier spacing is different from the second subcarrier spacing.

3. The method of claim 1, wherein the specific signal includes a part of the PSS, a part of the SSS, or a signal generated from a predetermined sequence.

4. A method performed by a terminal in a wireless communication system, the method comprising:
   receiving, from a base station, a synchronization signal block (SSB), the SSB including a primary synchronization signal (PSS), a secondary synchronization signal (SSS), and a physical broadcast channel (PBCH);
   performing decoding for the received SSB;
   obtaining a cell identification (ID) corresponding to a specific signal based on a decoding of a symbol for the PSS, in case that the specific signal is detected in the symbol for the PSS, wherein the symbol for the PSS includes a first portion for the PSS and a second portion for the specific signal corresponding to the cell ID; and
   obtaining the cell ID based on a decoding of a symbol for the SSS, in case that the specific signal is not detected in the symbol for the PSS;
   wherein the specific signal is mapped with the received SSB in case that an interference between the SSB and a data channel transmitted on a bandwidth part adjacent to the SSB does not exist.

5. The method of claim 4, wherein the specific signal includes a part of the PSS, a part of the SSS, or a signal generated from a predetermined sequence.

6. The method of claim 5, further comprising:
   identifying a table including the part of the PSS, the part of the SSS, or the signal generated from the predetermined sequence mapped to a corresponding cell ID; and
   obtaining the cell ID from the table.

7. A base station in a wireless communication system, the base station comprising:
   a transceiver; and
   a controller configured to:
      identify a first resource based on excluding a second resource from a synchronization signal block (SSB), wherein a primary synchronization signal (PSS), a secondary synchronization signal (SSS), and a physical broadcast channel (PBCH) are to be mapped to the second resource,
      determine whether to map a specific signal to the first resource based on an interference between the SSB and a data channel transmitted on a bandwidth part adjacent to the SSB, the specific signal corresponds to a specific cell identification (ID),
      map the specific signal to the first resource, in case that the interference does not exist, and
      control the transceiver to transmit, to a terminal, the SSB including the specific signal,
      wherein the first resource is located in a symbol in which the PSS is transmitted, and
      wherein the SSB is generated without mapping the specific signal, in case that the interference exists.

8. The base station of claim 7, wherein the controller is further configured to:
   compare a first subcarrier spacing of the SSB with a second subcarrier spacing of the data channel, and
   determine that the interference exists in case that the first subcarrier spacing is different from the second subcarrier spacing.

9. The base station of claim 7, wherein the specific signal includes a part of the PSS, a part of the SSS, or a signal generated from a predetermined sequence.

10. A terminal in a wireless communication system, the terminal comprising:
    a transceiver; and
    a controller configured to:
       control the transceiver to receive, from a base station, a synchronization signal block (SSB), the SSB including a primary synchronization signal (PSS), a secondary synchronization signal (SSS), and a physical broadcast channel (PBCH),
       perform decoding for the received SSB,
       obtain a cell identification (ID) corresponding to a specific signal based on a decoding of a symbol for the PSS, in case that the specific signal is detected in the symbol for the PSS, wherein the symbol for the PSS includes a first portion for the PSS and a second portion for the specific signal corresponding to the cell ID, and
       obtain the cell ID based on a decoding of a symbol for the SSS, in case that the specific signal is not detected in the symbol for the PSS,
       wherein the specific signal is mapped with the received SSB in case that an interference between the SSB and a data channel transmitted on a bandwidth part adjacent to the SSB does not exist.

11. The terminal of claim 10, wherein the specific signal includes a part of the PSS, a part of the SSS, or a signal generated from a predetermined sequence.

12. The terminal of claim 11, wherein the controller is further configured to:
  identify a table including the part of the PSS, the part of the SSS, or the signal generated from the predetermined sequence mapped to a corresponding cell ID, and
  obtain the cell ID from the table.

\* \* \* \* \*